United States Patent
Shimizu et al.

(10) Patent No.: US 8,868,861 B2
(45) Date of Patent: Oct. 21, 2014

(54) INFORMATION RECORDING APPARATUS AND COPY MANAGEMENT PROGRAM FOR CACHING CONTENT DATA OF DIGITAL CONTENT

(75) Inventors: Yuji Shimizu, Kodaira (JP); Takeshi Koda, Kodaira (JP)

(73) Assignee: Pioneer Corporation, Kawasaki-shi (JP)

( * ) Notice: Subject to any disclaimer, the term of this patent is extended or adjusted under 35 U.S.C. 154(b) by 352 days.

(21) Appl. No.: 13/264,066

(22) PCT Filed: Apr. 17, 2009

(86) PCT No.: PCT/JP2009/057748
§ 371 (c)(1), (2), (4) Date: Oct. 12, 2011

(87) PCT Pub. No.: WO2010/119563
PCT Pub. Date: Oct. 21, 2010

(65) Prior Publication Data
US 2012/0042143 A1   Feb. 16, 2012

(51) Int. Cl.
*G06F 13/00* (2006.01)
*G11B 20/00* (2006.01)
*G06F 21/10* (2013.01)

(52) U.S. Cl.
CPC .......... *G11B 20/00086* (2013.01); *G06F 21/10* (2013.01); *G11B 20/00115* (2013.01); *G11B 20/00753* (2013.01); *G11B 20/0076* (2013.01); *G11B 20/00862* (2013.01); *G11B 2220/2541* (2013.01); *G11B 2220/2562* (2013.01)
USPC .............................. 711/162; 711/151; 711/158

(58) Field of Classification Search
CPC .............. G06F 3/0623; G06F 11/1458; G06F 12/1416; G06F 13/122
USPC ........................................... 711/151, 159, 162
See application file for complete search history.

(56) References Cited

U.S. PATENT DOCUMENTS

| | | | |
|---|---|---|---|
| 7,996,873 B1* | 8/2011 | Nathan et al. | 725/91 |
| 2009/0327710 A1* | 12/2009 | Yoshizawa | 713/162 |
| 2010/0154067 A1 | 6/2010 | Shimizu et al. | |
| 2010/0177612 A1 | 7/2010 | Shimizu et al. | |
| 2010/0199104 A1* | 8/2010 | Van Rijnswou | 713/189 |
| 2011/0305435 A1* | 12/2011 | Tanaka et al. | 386/259 |

FOREIGN PATENT DOCUMENTS

| | | |
|---|---|---|
| EP | 1418580 | 5/2004 |
| JP | 2003-281816 | 10/2003 |
| JP | 2004-158082 | 6/2004 |
| JP | 2004-206826 | 7/2004 |

(Continued)

OTHER PUBLICATIONS

International Search Report for PCT/JP2009/057748 mailed May 19, 2009 (4 pages).

*Primary Examiner* — Reba I Elmore
(74) *Attorney, Agent, or Firm* — Nixon & Vanderhye P.C.

(57) ABSTRACT

In an information recording apparatus, when it is determined to perform a copy process, a copy processor copies content data cached in a first storage section to an information recording medium as copy destination. A process-result sender sends, to a copy-count management server, a result of the copy process. A cached-data abandoning unit abandons the content data cached in the first storage section if information regarding an allowable number of copies on which the result of the copy process has been reflected represents that a next copy process is disallowed.

8 Claims, 13 Drawing Sheets

(56) References Cited

FOREIGN PATENT DOCUMENTS

| | | |
|---|---|---|
| JP | 2008-153847 | 7/2008 |
| WO | WO 2008/126285 | 10/2008 |
| WO | WO 2008/126318 | 10/2008 |

* cited by examiner

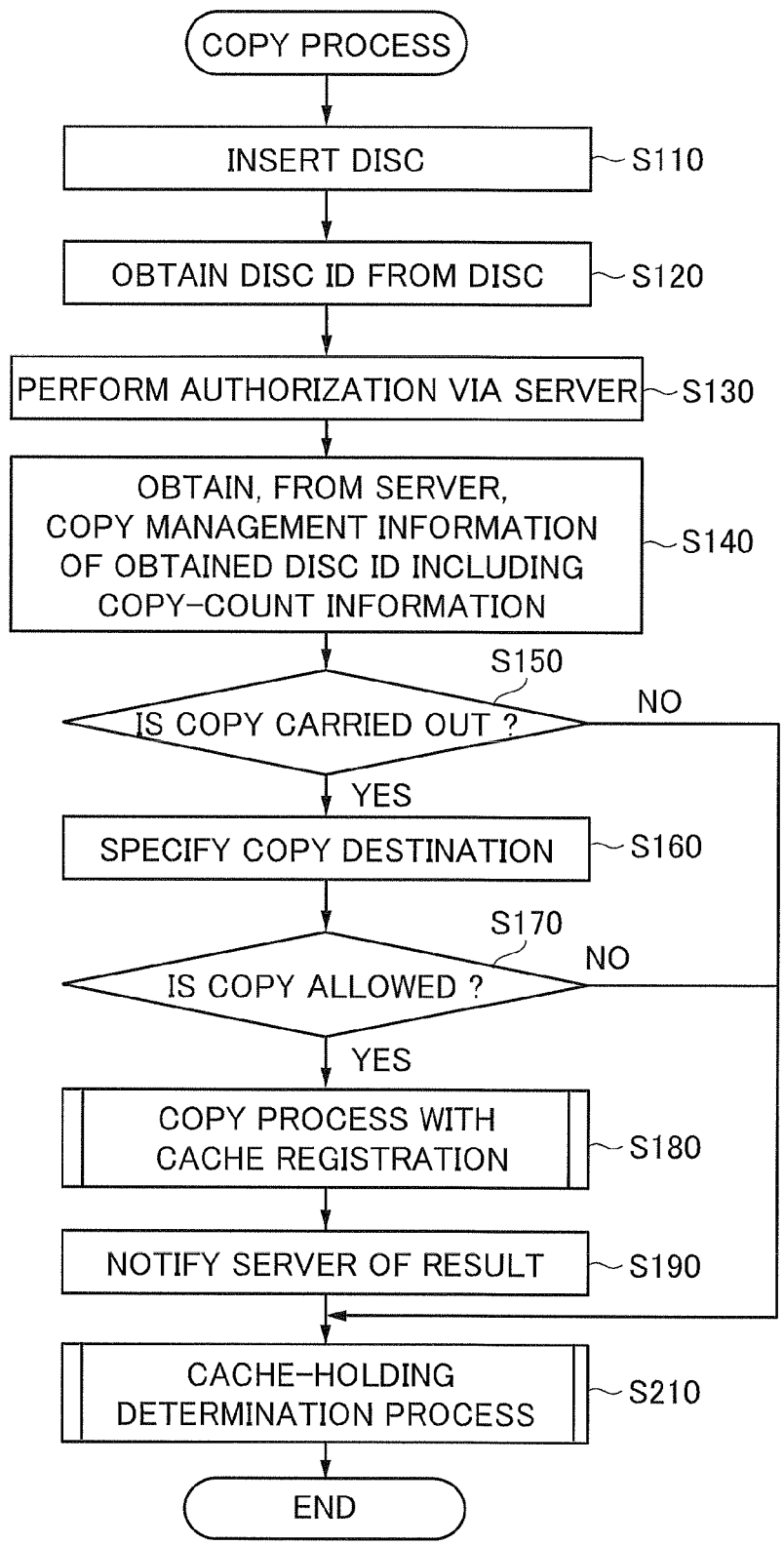

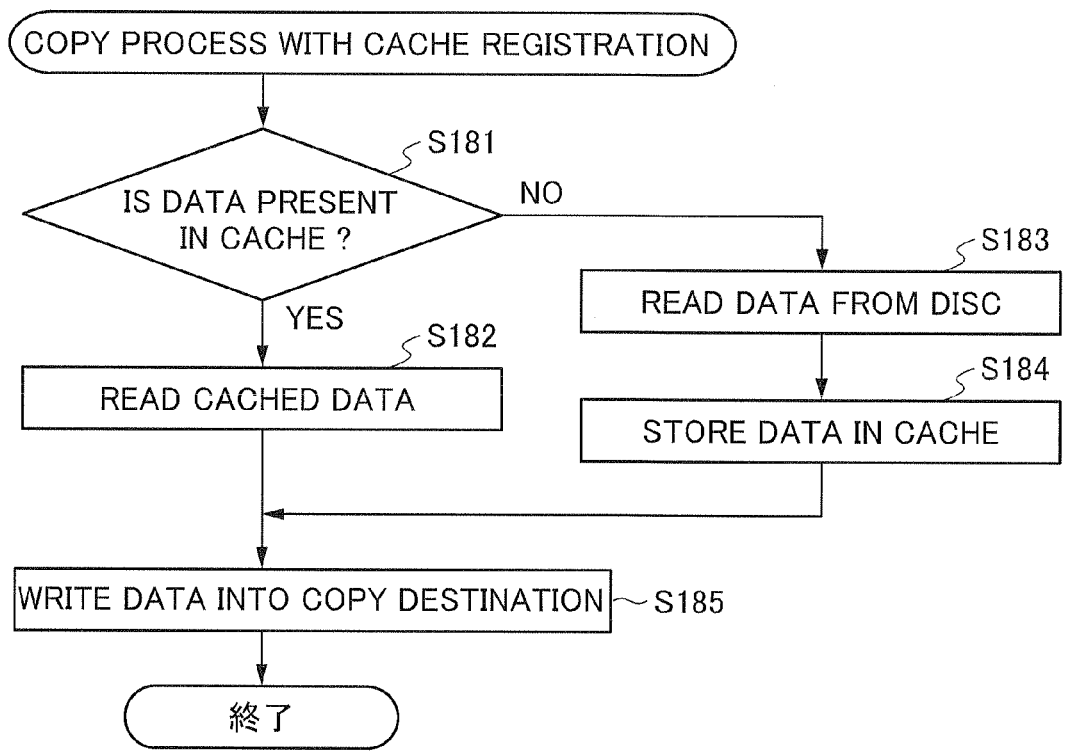
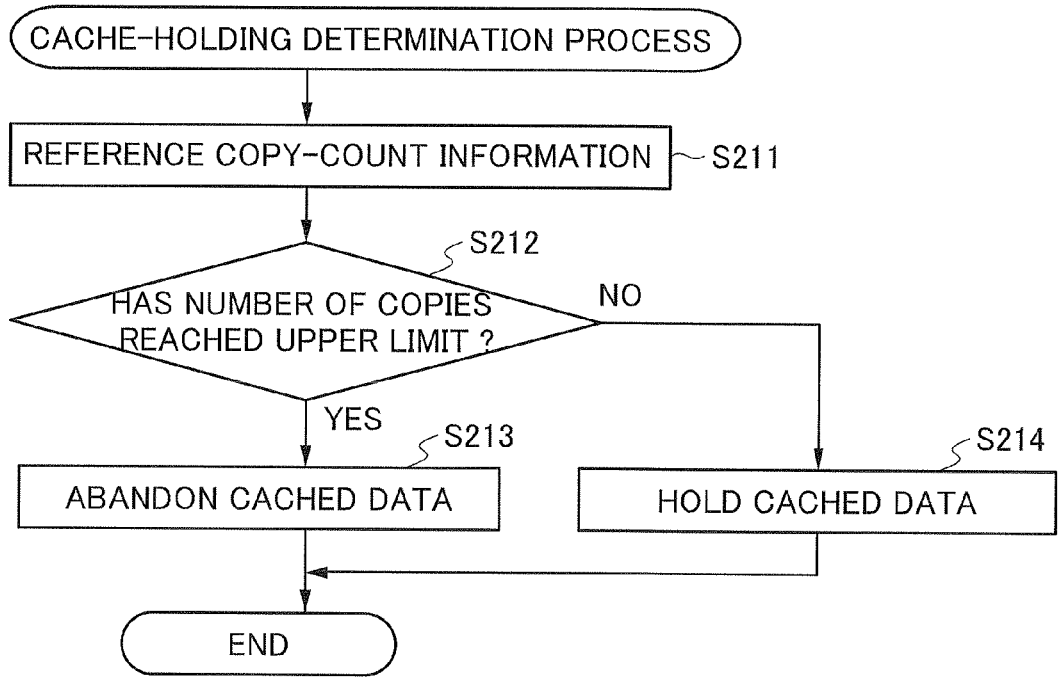

FIG. 9

| DISC ID | COPY-COUNT INFORMATION | | LIMITATION | CONTENT ATTRIBUTE INFORMATION | UPDATED DATE AND TIME | ...... |
|---|---|---|---|---|---|---|
| | TOTAL NUMBER OF COPIES | NUMBER OF COPIED TIMES | | | | |
| 221 | 222 | | 223 | 224 | 225 | |
| | 222a | 222b | | | | |

COPY MANAGEMENT INFORMATION 220

| DISC LIST | | |
|---|---|---|
| | TITLE | COPY-COUNT (COPIED/TOTAL) AND LIMITATION |
| | AAAAA<br>PERFORM : ○○○○○○ | 2/4 |
| | BBBBB<br>PERFORM : △△△△△△ | 1/2<br>COPY DESTINATION IS LIMITED TO BE EQUAL TO OR SMALLER THAN VGA SIZE |
| | CCCCC<br>PERFORM : ○△○△○△ | 0/1 |
| | DDDDD<br>PERFORM : □□□□□ | 1/1 | d10

US 8,868,861 B2

INFORMATION RECORDING APPARATUS AND COPY MANAGEMENT PROGRAM FOR CACHING CONTENT DATA OF DIGITAL CONTENT

This application is the U.S. national phase of International Application No. PCT/JP2009/057748 filed 17 Apr. 2009 which designated the U.S. the entire contents of each of which are hereby incorporated by reference.

TECHNICAL FIELD OF THE INVENTION

The present invention relates to technologies for managing copies of digital contents, and, more particularly, can be applied for information recording apparatuses supporting Managed copy.

BACKGROUND ART

One standard of "Managed copy" is established in the Advanced Access Control System, which is a digital content protection technology employed by next-generation optical discs, such as Blu-ray discs and DVDs. The "Managed copy" is a function of authorizing copies of digital contents by performing authentication via networks. For example, when a purchased optical disc is inserted into an information recording apparatus meeting the Managed copy, such as a blu-ray disc recorder, for copying, the information recording apparatus transmits a query to a managed-copy server that manages the number of copies, and obtains information associated with the number of copies of the optical disc. Then, the information recording apparatus determines whether to authorize a copy process, thus carrying out the copy process.

Note that the inventors have filed the following patent applications related to the "Managed copy".

First patent document: International Publication NO. WO/2008/126318

Second document: International Publication NO. WO/2008/126285

DISCLOSURE OF THE INVENTION

Problems to be Solved by the Invention

In the Managed copy, when a copy process is authorized, the copy process is performed by reading content data recorded in an inserted optical disc, and writing it into an information recording medium as its destination. In view of reduction of copy processing time, in comparison to the method of reading out content data from an optical disc to copy it for each copy, a method of caching data read from an optical disc into a mass storage device, and of copying the cached data seems to be preferable. Note that the mass storage device is an information recording medium, such as a HDD (Hard Disc Drive) and a SSD (Solid State Drive), which allows data to be read out faster than an optical disc medium.

However, using such a method would store large amounts of video content data and the like in the mass storage device, which would cause a problem of an increase of cached data to be stored in the mass storage device.

The present invention has been made to solve the aforementioned circumstances, and has an example of a purpose of providing information recording apparatuses and copy management programs, which are capable of performing copy processes based on cached data while reducing an increase of the volume of an area for cached data, thus efficiently managing the area for cached data.

Means for Solving the Problems

In order to achieve such a purpose provided above, one aspect of the present invention is an information recording apparatus mutually communicable with a copy-count management server that manages medium identifying information for uniquely identifying an information recording medium and information regarding an allowable number of copies of a digital content recorded in the information recording medium to be associated with each other. The information recording apparatus includes an identification information obtaining means that obtains the medium identifying information of an inserted information recording medium; a first information obtaining means that obtains the information regarding the allowable number of copies from the copy management server, the allowable number of copies being associated with the medium identifying information obtained by the identification information obtaining means; a cached-data registering means that caches content data of the digital content recorded in the inserted information recording medium in a first storage section at preset timing; a copy process means that: when receiving a copy request for the digital content recorded in the inserted information recording medium, determines whether to perform a copy process based on the information regarding the allowable number of copies obtained by the first information obtaining means, and when determining to perform the copy process, copies the content data cached in the first storage section to an information recording medium as copy destination; a process-result sending means that sends, to the copy-count management server, a result of the copy process by the copy process means; and a cached-data abandoning means that abandons the content data cached in the first storage section if the information regarding the allowable number of copies on which the result of the copy process by the copy process means has been reflected represents that a next copy process is disallowed.

Another aspect of the present invention is a copy management program readable by an information recording apparatus mutually communicable with a copy-count management server that manages medium identifying information for uniquely identifying an information recording medium and information regarding an allowable number of copies of a digital content recorded in the information recording medium to be associated with each other, the copy management program functioning the information recording apparatus as: an identification information obtaining means that obtains the medium identifying information of an inserted information recording medium; a first information obtaining means that obtains the information regarding the allowable number of copies from the copy management server, the allowable number of copies being associated with the medium identifying information obtained by the identification information obtaining means; a cached-data registering means that caches content data of the digital content recorded in the inserted information recording medium in a first storage section at preset timing; a copy process means that: when receiving a copy request for the digital content recorded in the inserted information recording medium, determines whether to perform a copy process based on the information regarding the allowable number of copies obtained by the first information obtaining means, and when determining to perform the copy process, copies the content data cached in the first storage section to an information recording medium as copy destination; a process-result sending means that sends, to the copy-count management server, a result of the copy process by the copy process means; and a cached-data abandoning means that abandons the content data cached in the first storage section if the information regarding the allowable number of copies on which the result of the copy process by the copy process means has been reflected represents that a next copy process is disallowed.

BRIEF DESCRIPTION OF THE DRAWINGS

FIG. 5 is a flowchart illustrating a copy process of the managed-copy compliant information recording apparatus of the copy management system according to the first embodiment of the present invention;

FIG. 6 is a flowchart illustrating a copy process with cache registration of the managed-copy compliant information recording apparatus of the copy management system according to the first embodiment of the present invention;

FIG. 7 is a flowchart illustrating a cache-holding determination process of the managed-copy compliant information recording apparatus of the copy management system according to the first embodiment of the present invention;

FIG. 9 is a structural view of copy management information managed by a managed-copy authorization server of the copy management system according to the second embodiment of the present invention;

EMBODIMENTS FOR CARRYING OUT THE INVENTION

Embodiments of the present invention will be described hereinafter with reference to the drawings.

First Embodiment

Figure 1:
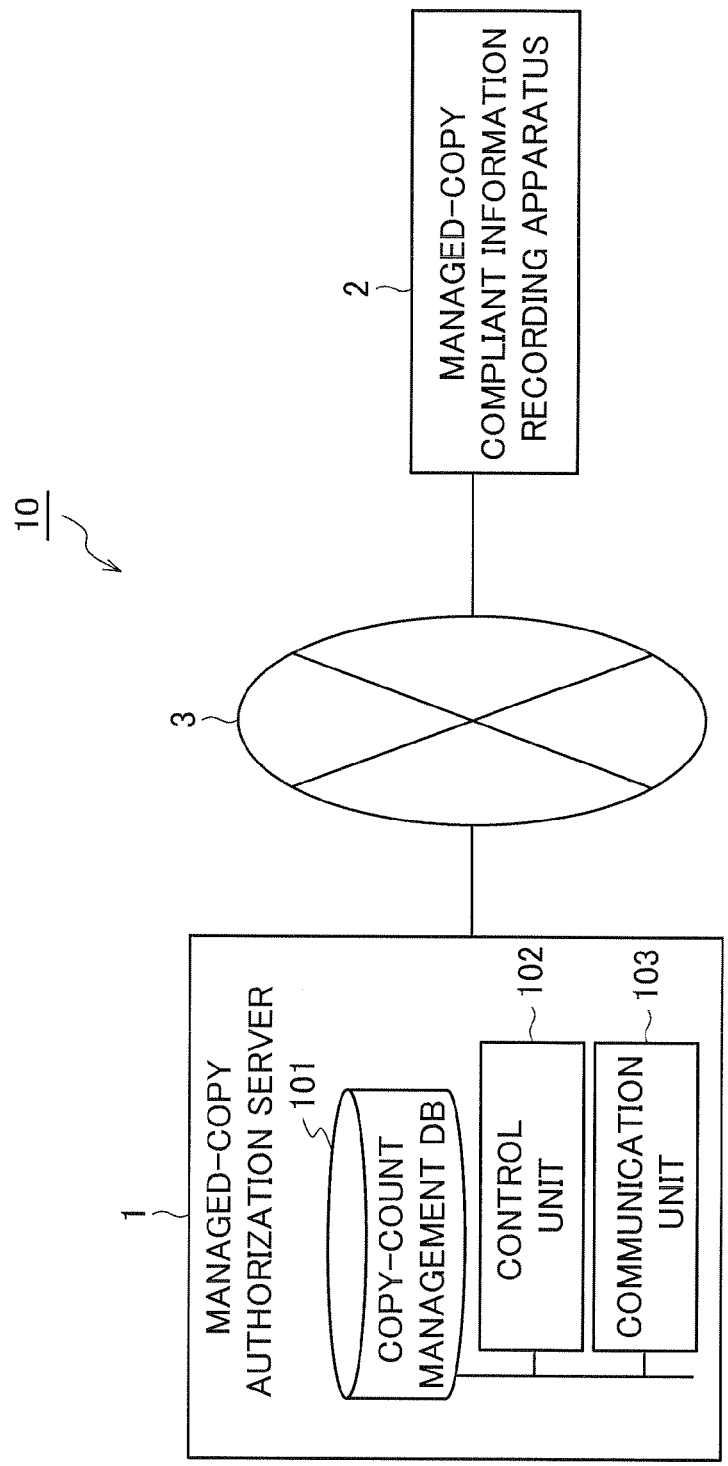
FIG. 1 is a schematic structural view of a copy management system according to the first embodiment of the present invention.

FIG. 1 is a schematic structural view of a copy management system 10 according to the first embodiment of the present invention. The copy management system 10 illustrated in FIG. 1 is a computer system that conforms to the standard of "Managed Copy", and is comprised of a managed-copy authorization server 1, a managed-copy compliant information recording apparatus 2, and a communication network, such as an internet network, 3 that allow mutual communications between the managed-copy authorization server 1 and the managed-copy compliant information recording apparatus 2. This configuration allows the managed-copy compliant information recording apparatus 2, which intends to copy digital contents recorded in an information recording medium (optical disc), access to the managed-copy authorization server 1 so that the managed-copy authorization server 1, which manages information indicative of the number of copies, gives, to the managed-copy compliant information recording apparatus 2, authorization to carry out copy processes. This allows the managed-copy compliant information recording apparatus 2 to carry out copy processes.

Hereinafter, a Blu-ray Disc recorder, which is one of next-generation DVD recorders, will be described as the managed-copy compliant information recording apparatus 2, but information recording apparatuses are not limited thereto. Any information recording apparatuses, which conform to the standard of "Managed Copy", can be used. For example, HD DVD (High Definition DVD) recorders, DVD recorders, HDD recorders, AV servers, and computers can be used. Next-generation players, such as BD players and HD DVD players, and playback devices, such as DVD players, can be used as long as they meet the standard of "Managed Copy", and can perform copy processes. In the first embodiment, the copy management system 10 will be described as a computer system that conforms to the standard of "Managed Copy", but it is not limited thereto. Specifically, as the copy management system, a system that conforms to any standard can be used as long as it is designed such that: an information recording apparatus performs authorization with respect to a server that manages the number of copies of digital contents recorded on an information recording medium, and the information recording apparatus controls, based on obtained information indicative of the number of copies from the server, whether to permit copy processes.

The managed-copy authorization server, which will be referred to as a "server", 1 is a server for managing the number of copies of each information recording medium (optical disc). Specifically, the server 1 is comprised of a copy-count management database, which will be referred to as a "copy-count management DB", 101, a control unit 102, and a communication unit 103.

Figure 2:
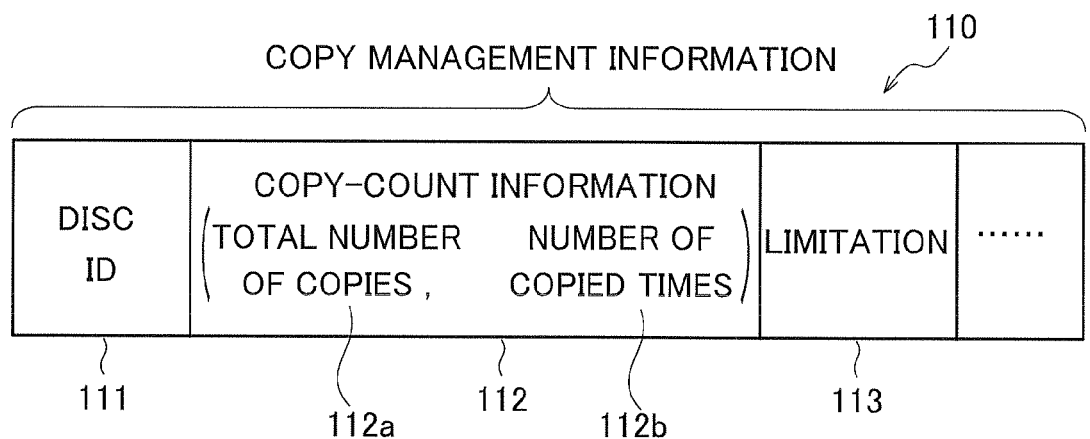
FIG. 2 is a structural view of copy management information managed by a managed-copy authorization server of the copy management system according to the first embodiment of the present invention.

The copy-count management DB 101 is a database for managing the number of copies of each information recording medium (optical disc). Specifically, as illustrated in FIG. 2, the copy-count management DB 101 stores therein copy management information 110, and manages it; the copy management information 110 consists of items of disc IDs 111, copy-count information 112, and copy limitation information 113. In the first embodiment, each disc ID 111 is comprised of a prerecorded media serial number and a corresponding content ID, which can uniquely identify a corresponding optical disc and a corresponding recorded content.

The copy-count information 112 includes the presently authorized number of copies representing the number of times that the corresponding disc can be copied at present. Specifically, the copy-count information 112 consists of the total number of copies 112a and the number of copied times 112b. The total number of copies 112 represents that the maximum number of copies predetermined for the corresponding optical disc, and the number of copied times 112b represents the number of times that have been already copied. For example, if the total number of copies is three and the number of copied times is one, the remaining two copies can be performed at present. The copy limitation information 113 includes a limitation if the limitation is put to a copy process. If a kind of information recording media as destinations of copy is limited, a limitation indicative of the kind of information recording media is the copy limitation information 113, and if copyright-protection systems in destinations of copy are limited, a limitation indicative of the copyright-protection systems is the copy limitation information 113. For example, information recording media each having the VGA size or lower are limited as destinations of copy are set as the copy limitation information 113.

The control unit 102 is comprised of a CPU including at least computing functions and control functions, and a main memory consisting of, for example, a ROM and a RAM, which has a function of storing programs and data. The control unit 102 is operative to carry out overall control of the server 1.

The communication unit 103 is operative to transmit and/or receive data to and/or from the managed-copy compliant information recording apparatus 2 via the communication network 3.

Figure 3:
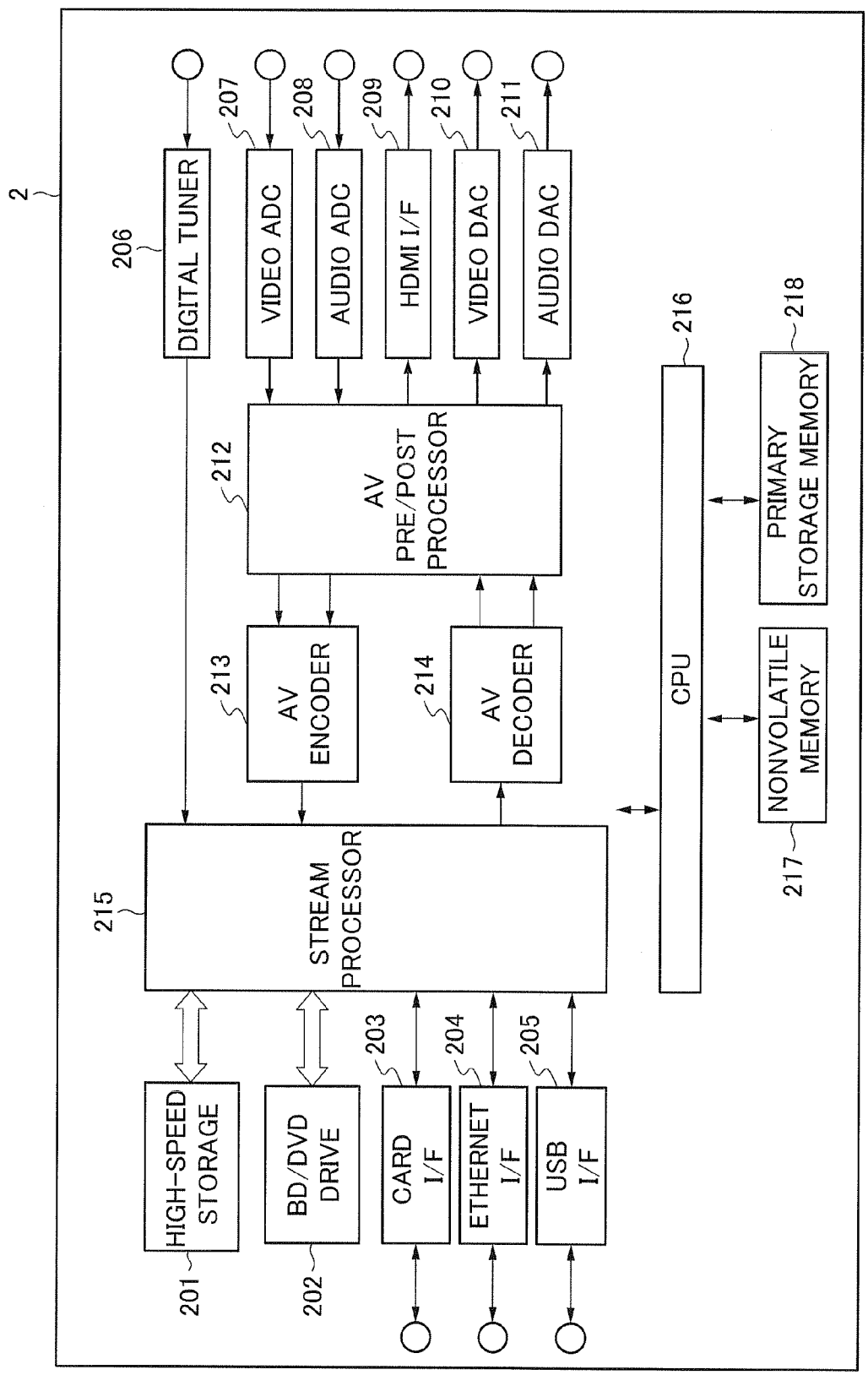
FIG. 3 is a functional block diagram of a managed-copy compliant information recording apparatus of the copy management system according to the first embodiment of the present invention.

FIG. 3 is a functional block diagram of the managed-copy compliant information recording apparatus 2, which will be referred to as an "information recording apparatus".

The information recording apparatus 2 is comprised of a high-speed storage 201 and a BD/DVD drive 202. The high-speed storage 201 is made up of, for example, a HDD (Hard Disc Drive) or an SSD (Solid State Drive), and operative to read data faster than at least an optical disc medium. The BD/DVD drive 202 is operative to record data into the high-speed storage, playback data therefrom, record data into a BD and/or DVD, and playback data therefrom.

The information recording apparatus 2 is also operative to communicate with externally-connected devices, such as memory cards, network devices, and USB devices, via interfaces including a card I/F 203, an Ethernet® I/F 204, and/or a USB interface 205. In the first embodiment, it is possible to copy digital contents recorded in optical discs, such as Bluray discs and/or DVDs, to an optical disc, the high-speed storage, and/or an externally-connected device. Although detailed descriptions will be later, the high-speed storage 201 is provided with a cache for caching digital contents recorded in an optical disc (BD/DVD). It is possible to perform copy using data stored in the cache faster than to perform copy using data stored in an optical disc.

A digital tuner 206 receives digital broadcasts. A video ADC (video A/D converter) 207 carries out analog-to-digital conversion of video signals inputted from external devices, and an audio ADC (audio A/D converter) 208 carries out analog-to-digital conversion of audio signals inputted from external devices.

A HDMI (High-Definition Multimedia Interface) I/F 209 carries out interface conversion of video signals, audio signals, and control signals according to the HDMI standard. A video DAC (video D/A converter) 210 carries out digital-to-analog conversion of video signals, and outputs converted analog video signals to external devices. An audio DAC (audio D/A converter) 211 carries out digital-to-analog conversion of audio signals, and outputs converted analog audio signals to external devices.

An AV pre/post processor 212 performs preprocessing of a video signal and an audio signal inputted from the respective video ADC 207 and the audio ADC 208 specifically including time-base correction, image-quantity improvement, and the like. The AV pre/post processor 212 also performs postprocessing of a video signal and an audio signal, specifically including image-quantity improvement, a compositing process, a pixel conversion process, a frame conversion process, or the like. The AV pre/post processor 212 outputs results of the postprocessing to the HDMI I/F 209, video DAC 210, and audio DAC 211.

An AV encoder 213 encodes and multiplexes a video signal and an audio signal outputted from the AV pre/post processor 212, and outputs the results to a stream processor 215. An AV decoder 214 performs a decode process and a data isolation process of a video signal and an audio signal inputted from the stream processor 215, and outputs the results to the AV pre/post processor 212. In the first embodiment, because copy is carried out between different information recording media, code conversion is carried out via the AV decoder 214 and the AV encoder 213.

The stream processor 215 performs control of data transfer, encryption of data, and/or decoding of encrypted data.

A CPU 216 serves as a computing and control means of the information recording apparatus 2, a nonvolatile memory 217 is means for storing programs and data, and a primary storage memory 218 serves as a primary storage means of stream data and/or display data.

Specifically, in the nonvolatile memory 217, programs, which cause the information recording apparatus 2 to perform various processes described later, are stored. These programs are stored in the nonvolatile memory 217, and can be stored in computer-readable recording mediums, such as a hard disc, a flexible disc, a CD-ROM, and a DVD, or can be distributed via a communication network.

Figure 4:
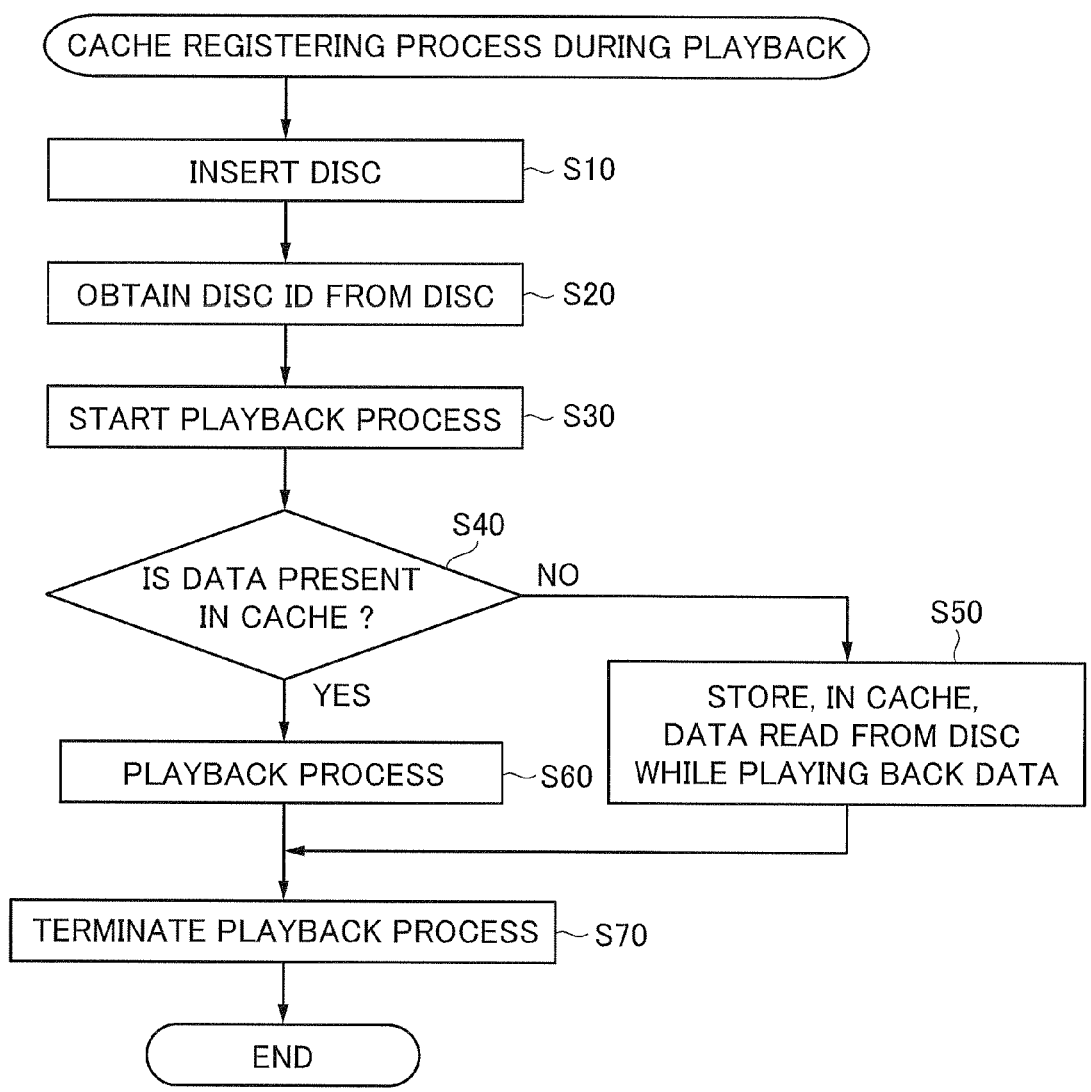
FIG. 4 is a flowchart illustrating a cache registering process, during playback, of the managed-copy compliant information recording apparatus of the copy management system according to the first embodiment of the present invention.

Next, operations of the information recording apparatus 2 will be described with reference to FIGS. 4 to 7. FIG. 4 is a flowchart illustrating a cache registering process of the information recording apparatus 2 during playback, FIG. 5 is a flowchart illustrating a copy process of the information recording apparatus 2, FIG. 6 is a copy process with cache registration, and FIG. 7 is a flowchart illustrating a cache-holding determination process. Note that each of the processes illustrated in FIGS. 4 to 7 is executed by the CPU 216 of the information recording apparatus 2.

First, the cache registering process of the information recording apparatus 2 during playback will be described with reference to FIG. 4. The cache registering process during playback is a process to register content data recorded in an optical disk into the cache when the information recording apparatus 2.

The information recording apparatus 2 inserts thereinto a user-mounted optical disc in step S10, and obtains a disc ID from the optical disc in step S20.

Next, the information recording apparatus 2 starts to playback content data stored in the optical disk in step S30, and determines whether content data, which is the same as the played-back content data, is present in the cache of the high-speed storage 201 in step S40. Specifically, in the first embodiment, the cache of the high-speed storage 201 is managed such that content data stored therein is correlated with a disc ID. For this reason, it is determined whether content data whose disc ID is the same as the disc ID of the optical disc obtained in step S20 is present in the cache.

If content data, which is the same as the played-back content data, is not present in the cache of the high-speed storage 201 (NO in step S40), the information recording apparatus 2 stores the content data read from the optical disc in the cache while playing back the content data in step S50.

Otherwise, if content data, which is the same as the played-back content data, is present in the cache of the high-speed storage 201 (YES in step S40), the information recording apparatus 2 plays back the content data stored in the optical disc in step S60.

Next, the information recording apparatus 2 terminates the playback of the content data recorded in the optical disc in step S70.

As described above, the information recording apparatus 2 according to this embodiment is configured to, when playing back content data recorded in an optical disc, cache the content data in the cache of the high-speed storage 201. Note that data to be cached is not limited to content data being played back, and can include another content data, such as content data recorded in a bonus track. In this case, another content data can be cached within spare time during playback.

Next, the copy process of the information recording apparatus 2 will be described with reference to FIG. 5.

The information recording apparatus 2 inserts thereinto a user-mounted optical disc in step S110, and obtains a disc ID from the optical disc in step S120.

Next, the information recording apparatus 2 accesses to the server 1 via the communication network 3 based on the obtained disc ID, thus performing authorization in step S130.

The information recording apparatus 2 authorized by the server 1 obtains copy management information 110 from the server 1 in step S140. Specifically, the information recording apparatus 2 retrieves, based on the obtained disc ID, copy management information 110 corresponding to the obtained disc ID from the copy-count management DB 101; the copy management information 110 includes the copy-count information 112 and the copy limitation information 113. Note that the retrieved copy management information 110 can be displayed on a display of the information recording apparatus 2 or an image display device, such as a TV, connected with the information recording apparatus 2. This can show the retrieved copy management information 110 to users.

Next, the information recording apparatus 2 determines whether copy process is selected by a user in step S150. If the copy process is selected by a user (YES in step S150), the information recording apparatus 2 receives specification of an information recording medium as copy destination in step S160.

Subsequently, the information recording apparatus 2 determines whether copy is allowed in step S170. If it is determined that copy is allowed based on the copy-count information 112 and the copy limitation information 113 of the retrieved copy management information 110 (YES in step S170), the information recording apparatus 2 proceeds to step S180.

In step S180, the information recording apparatus 2 performs a copy process with cache registration based on content data (cached data) stored in the cache of the high-speed storage 201 described in detail later, and provides, to the sever 1, notification of the result of the copy process in step S190. When receiving the notification indicative of the copy process being normally completed, the server 1 increments the number of copied times of the corresponding disc ID 111 to reflect the result of the copy process on the copy-count management DB 101.

The case where copy is allowed means that the total number of copies 112 is greater than the number of copied times 112b in the retrieved copy-count information 112. If there is a limitation in the copy limitation information 113, the case where copy is allowed means that the corresponding copy process is within the limitation.

Otherwise, if it is determined that a user does not select copy process or copy is disallowed (NO in step S170), the information recording apparatus 2 does not perform the copy process.

Subsequently, the information recording apparatus 2 determines whether to hold the content data (cached data) stored in the cache of the high-speed storage 201 in step S210 described in detail later.

Next, the copy process with cache registration will be described in detail hereinafter with reference to FIG. 6. FIG. 6 is a flowchart illustrating in detail the copy process with cache registration in step S180 of FIG. 5.

First, the information recording apparatus 2 determines whether content data, which is the same as content data recorded in the optical disc, is present in the cache of the high-speed storage 201 in step S181. Specifically, the information recording apparatus 2 determines whether content data whose disc ID is the same as a disc ID of the optical disc obtained in step S120 of the copy process illustrated in FIG. 5 is present in the cache.

If content data, which is the same as content data of the optical disc, is present in the cache of the high-speed storage 201 (YES in step S181), the information recording apparatus 2 reads the content data (cached data) stored in the cache in step S182. Then, the information recording apparatus 2 writes the content data into the information recording medium as copy destination in step S185.

Otherwise, if content data, which is the same as content data of the optical disc, is not present in the cache of the high-speed storage 201 (NO in step S181), the information recording apparatus 2 reads the content data from the optical disc, and stores the content data in the cache of the high-speed storage 201 in step S184. Thereafter, the information recording apparatus 2 writes the content data into the information recording medium as copy destination in step S185.

Note that, in this embodiment, if content data, which is the same as content data of the optical disc, is not present in the cache of the high-speed storage 201 (NO in step S181), the information recording apparatus 2 stores the content data in the cache of the high-speed storage 201, and thereafter, writes the content data into the information recording medium as copy destination. However, the present invention is not limited to the execution sequence. Specifically, the information recording apparatus 2 can parallelly carry out data storage into the cache and data storage into the information recording medium as copy destination by writing the content data into the information recording medium as copy destination while storing the content data in the cache of the high-speed storage 201.

As described above, in this embodiment, if content data, which is the same as content data to be copied, is present in the cache of the high-sped storage 201, it is possible to copy the content data stored in the cache. This speeds up the copy process. That is, because the time required to read content data from the high-speed storage 201 is shorter than the time required to read content data from an optical disk, it is possible to increase the copy-process speed.

The case where content data, which is the same as content data to be copied, is present means the case where, before copy of content data, the same content data has been played back, or the case where, before copy of content data, the same content data has been copied. That is, for copy of content data, if the same content data has been played back or copied, it is possible to speed up the copy of the content data.

Next, the cache-holding determination process will be described in detail with reference to FIG. 7. FIG. 7 is a flowchart illustrating in detail the the cache-holding determination process in step S210 of FIG. 5.

First, the information recording apparatus 2 references the corresponding copy-count information 112 in step S211. The copy-count information 112 is information of the number of copies on which the results of the copy processes have been reflected. Specifically, if copy is carried out during the copy process illustrated in FIG. 5, the corresponding copy-count information 112 means information indicative of the sum of the number of copied times 112b of the copy-count information 112 obtained in step S140 and 1. Otherwise, if copy is not carried out during the copy process illustrated in FIG. 5, the corresponding copy-count information 112 means information indicative of the number of copied times 112b of the copy-count information 112 obtained in step S140.

For example, if copy is carried out during the copy process illustrated in FIG. 5 with the total number of copies 112a and the number of copied times 112b of the obtained copy-count information 112 being respectively set to 3 and 1, the total number of copies 112a is 3, and the number of copied times 112b is updated to 2.

Subsequently, the information recording apparatus 2 determines whether the number of copies has reached its upper limit in step S212. Specifically, the information recording apparatus 2 determines whether the total number of copies 112a and the number of copied times 112b are in agreement with each other. For example, if the total number of copies 112a is 3 and the number of copied times 112b is 3, it is determined that the number of copies has reached its upper limit.

If the number of copies has reached its upper limit (YES in step S212), the information recording apparatus 2 abandons the corresponding content data (cached data) stored in the cache because subsequent copy processes are not allowed in step S213. Otherwise, if the number of copies has not reached its upper limit (NO in step S212), the information recording apparatus 2 holds the corresponding content data (cached data) stored in the cache because a subsequent copy process is allowed in step S214.

As described above, the information recording apparatus 2 according to this embodiment is adapted to determine whether to hold content data stored in the cache based on the corresponding current copy-count information. This prevents unnecessary content data from being stored in the cache, making it possible to effectively use the cache.

Performing the copy process based on content data stored in the cache of the high-speed storage 201 speeds up the copy process. However, because large amounts of video content data may be stored in the cache, the capacity of the cache may be increased.

However, because the information recording apparatus 2 obtains corresponding copy-count information from the server 1, the information recording apparatus 2 grasps, based on the corresponding current copy-count information, content data whose subsequent copy processes are disallowed. Thus, it is possible to delete content data from the cache if subsequent copy processes of the content data are disallowed.

As described above, even when performing a copy process based on cached data, the information recording apparatus 2, which meets the Managed-Copy standard, according to this embodiment prevents the capacity of the cache from being increased, thus efficiently managing the cache.

Note that, if the server 1 stores different items of the copy-count information for respective different information recording media, the information recording apparatus 2 can obtain at least one item of the copy-count information corresponding to at least one information recording medium that can be copied. For example, if the server 1 stores one item of the copy-count information for a BD representing that two copies are allowed, an alternative item of the copy-count information for a DVD representing that two copies are allowed, and a further item of the copy-count information for a HD representing that one copy is allowed, and if the information recording apparatus 2 can play back only DVDs and HDs without disabling playback of BDs, the information recording apparatus 2 can obtain only two items of the copy-count information for the DVD and HD.

Second Embodiment

Figure 8:
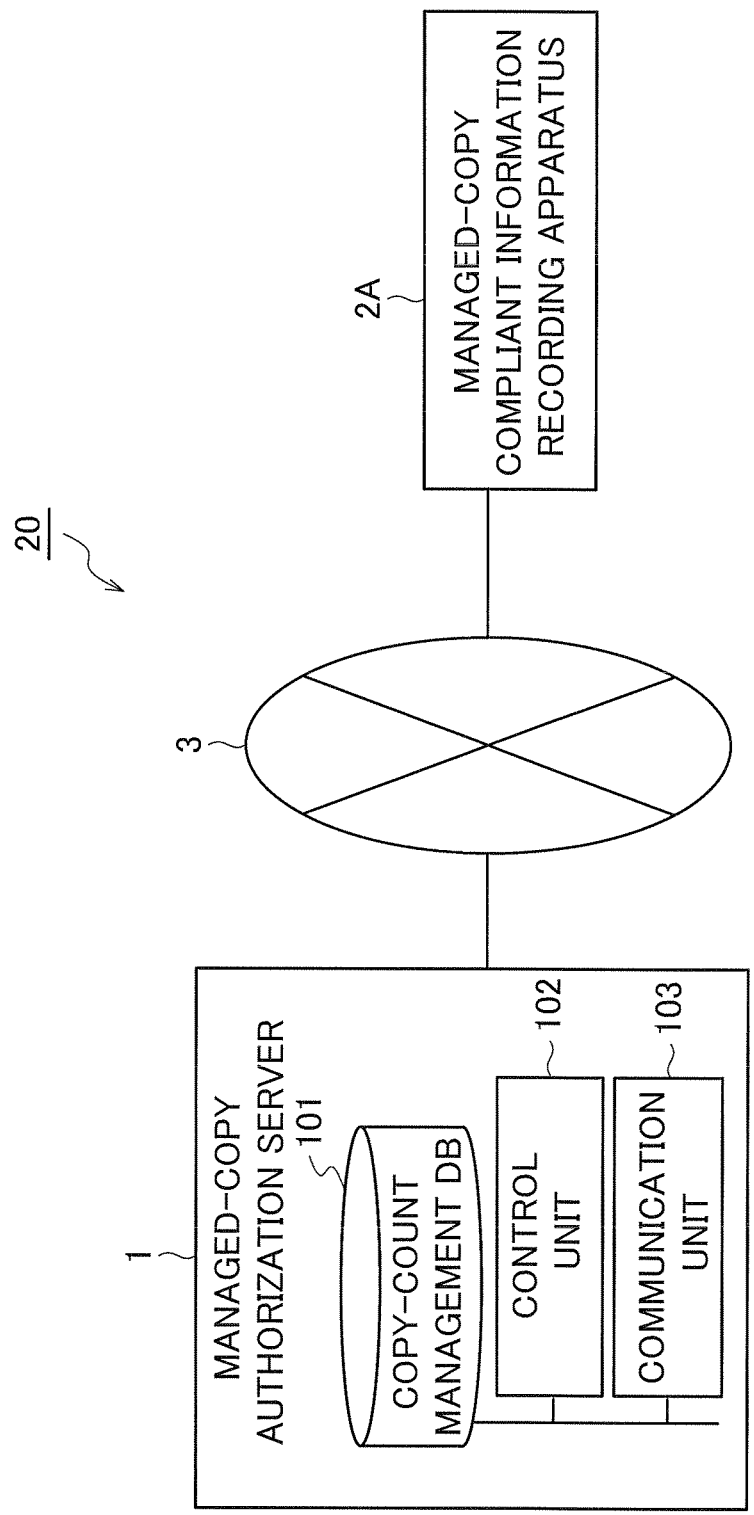
FIG. 8 is a schematic structural view of a copy management system according to the second embodiment of the present invention.

FIG. 8 is a schematic structural view of a copy management system 20 according to the second embodiment of the present invention. The copy management system 20 has a structure substantially identical to the structure of the copy management system 10 except that an information recording apparatus 2A stores and manages copy management information therein. In the first embodiment, information associated with the number of copies can be presented to users only when a corresponding optical disc is inserted into the information recording apparatus 2. However, in the second embodiment, it is possible to present information associated with the number of copies to users without a corresponding optical disc being inserted into the information recording apparatus 2A. This more improves the convenience of the copy management system for users. Note that structural elements, functions, and processes of the second embodiment, which are different from those of the first embodiment, will be only described. In the first and second embodiments, like structural elements, like functions, and like processes therebetween, to which like reference characters are assigned, are omitted in description.

Because the information recording apparatus 2A has substantially the same structure as the structure of the information recording apparatus 2, the description of the information recording apparatus 2A using a functional block diagram is omitted. Thus, copy management information 220 to be managed by the nonvolatile memory 217 will be described hereinafter.

FIG. 9 is a view illustrating the structure of the copy management information 220 stored in the nonvolatile memory 217. The copy management information 220, which is managed for each information recording media (each optical disc), is stored. The copy management information 220 is information generated by the copy management information 110 obtained from the server 1, and has a structure substantially identical to the structure of the copy management information 110 except that additional items of content attribute information, and updated date and time are provided in the copy management information 220. The content attribute information includes the title, performer information, genre information, and a jacket image of a corresponding content.

Specifically, as illustrated in FIG. 9, the copy count-information 220 consists of items of disc IDs 221, copy-count information 222 (specifically, the total number of copies 222a and the number of copied times 222b), copy limitation information 223, content attribute information 224, and updated date and time 225. Note that the content attribute information 224 can be obtained from an optical disc attached to the information recording apparatus 2, or can be obtained via the communication network 3 from a server that manages the content attribute information, such as the server 1 if the server 1 stores the content attribute information.

Figure 10:
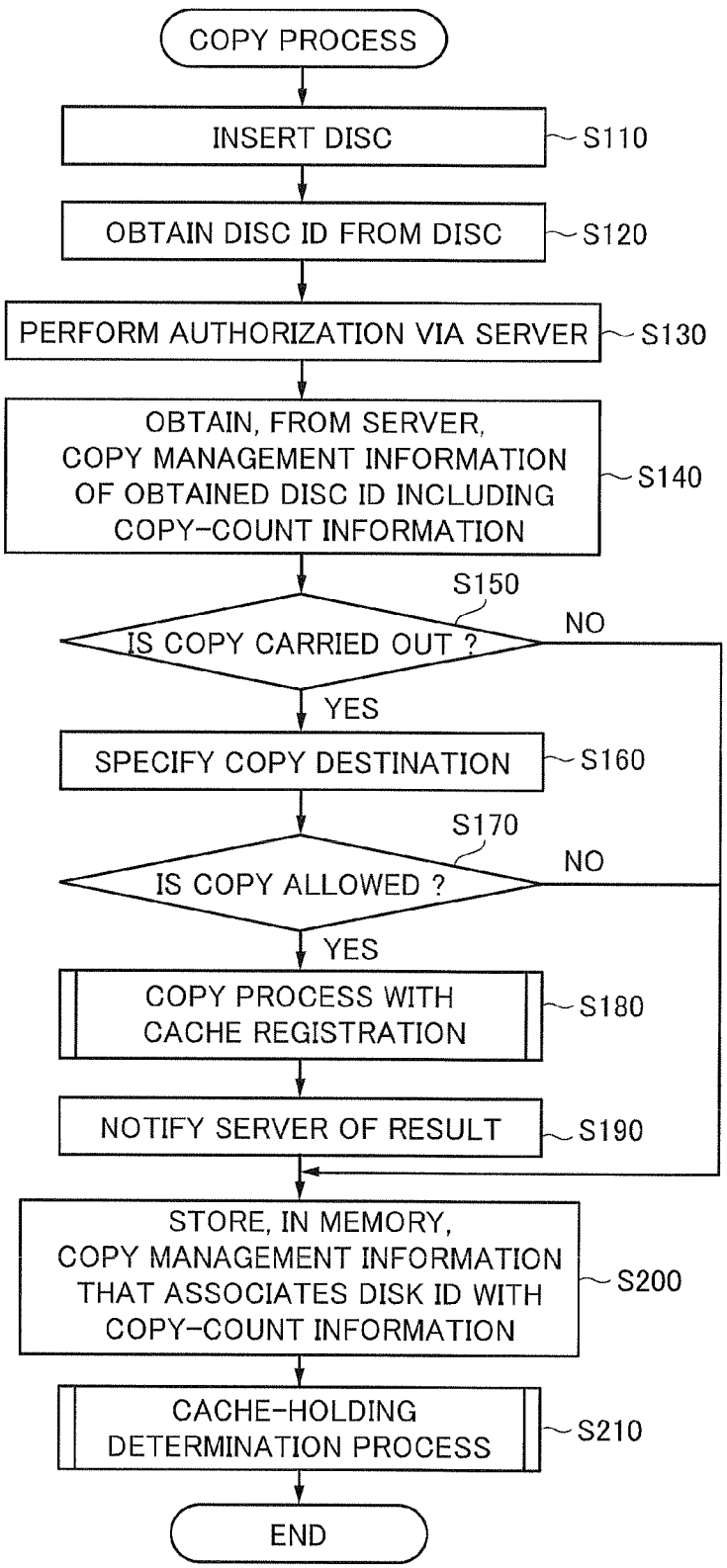
FIG. 10 is a flowchart illustrating a copy process of the managed-copy compliant information recording apparatus of the copy management system according to the second embodiment of the present invention.
Figures 11, 12:
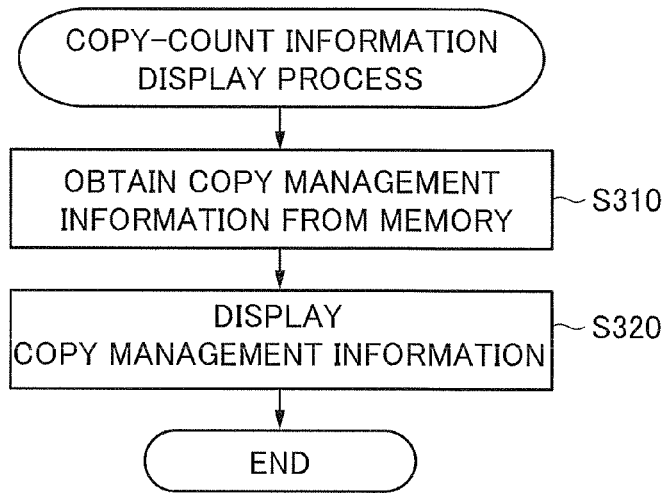
FIG. 11 is a flowchart illustrating a copy-count information display process of the managed-copy compliant information recording apparatus of the copy management system according to the second embodiment of the present invention.
FIG. 12 is a screen example displayed by the copy-count information display process illustrated in FIG. 11.
Figure 13:
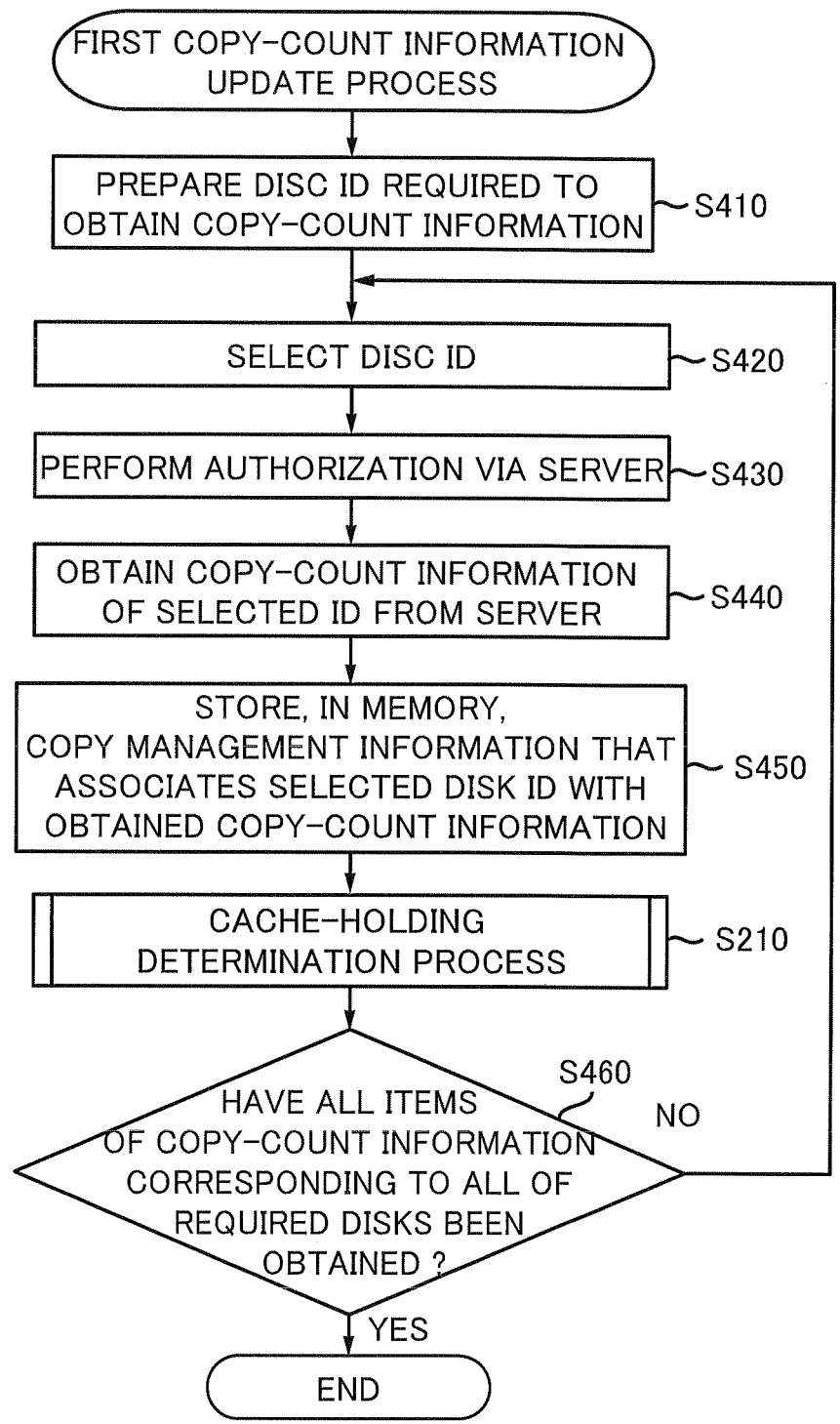
FIG. 13 is a flowchart illustrating a first copy-count information update process of the managed-copy compliant information recording apparatus of the copy management system according to the second embodiment of the present invention.

Next, operations of the information recording apparatus 2A will be described with reference to FIGS. 10 to 13. FIG. 10 is a flowchart illustrating a copy process of the information recording apparatus 2A, FIG. 11 is a copy-count information display process of the information recording apparatus 2A, and FIG. 13 is a first copy-count information update process of the information recording apparatus 2A. FIG. 12 is a screen example on which the copy-count information is displayed by the information recording apparatus 2A. Note that each of the processes illustrated in FIGS. 10, 11, and 13 is executed by the CPU 216 of the information recording apparatus 2A.

First, the copy process of the information recording apparatus 2A will be described with reference to FIG. 10. Note that, because the operations from step S110 to S190 of the copy process illustrated in FIG. 10 are the same as those from step S110 to S190 of the copy process illustrated in FIG. 5, they are omitted in description, and therefore, the operations from step S200 and thereafter will be described.

If the copy process is selected (YES in step S150) and copy is allowed (YES in step S170), the information recording apparatus 2A proceeds to step S200. In step S200, the information recording apparatus 2A sets, based on the obtained copy management information 110, the disc ID 221, the copy-count information 222, and the copy limitation information 223, obtains corresponding content attribute information 224 from a predetermined information source to set it, and sets, to the updated date and time 225, information indicative of the current date and time obtained by a clock included in the information recording apparatus 2A, thus generating the copy management information 220 in step S200. Then, the information recording apparatus 2A stores the copy management information 220 in the nonvolatile memory 217 in step S200. Specifically, the sum of the number of copied times $112b$ of the copy-count information 112 obtained from the server 1 and 1 is set to the number of copied times $222b$ of the copy-count information 222, and the copy management information 220 is stored in the non-volatile memory 217.

Otherwise, if the copy process is not selected (NO in step S150) or the copy is disallowed (NO in step S170), the information recording apparatus 2A does not perform a copy process, and sets, based on the obtained copy management information 110, the disc ID 221, the copy-count information 222, and the copy limitation information 223, obtains the content attribute information 224 from the predetermined information source to set it, and sets, to the updated date and time 225, information indicative of the current date and time obtained by the clock included in the information recording apparatus 2A, thus generating the copy management information 220 in step S200. Then, the information recording apparatus 2A stores the copy management information 220 in the nonvolatile memory 217 in step S200. Specifically, the number of copied times $112b$ of the copy-count information 112 obtained from the server 1 is stored, as it is, in the non-volatile memory 217 as the copy management information 222.

As a result, when a copy process is carried out (accurately, when an optical disc is inserted into the information recording apparatus 2A and the copy management information 110 including the copy-count information 112 is obtained from the server 1 without executing the copy process in step S180), the copy management information 220 associated with each digital content recorded in the optical disc as copy source is stored in the nonvolatile memory 217 of the information recording apparatus 2A. For this reason, thereafter, it is possible for the information recording apparatus 2A to manage the copy-count information of each of the digital contents recorded in the optical disc.

Subsequently, the information recording apparatus 2A determines whether to hold the cached data stored in the cache of the high-speed storage 201 in step S210. The determination of whether to hold the cache in step S210 is the sequence of operations illustrated in FIG. 7 as well as the first embodiment. However, in step S211, when referencing the copy-count information, the information recording apparatus 2A references the copy-count information 222 of the copy management information 220 stored in the nonvolatile memory 217.

Next, the copy-count information display process of the information recording apparatus 2A will be described with reference to FIG. 11.

When a user instructs the display of the copy-count information to the information recording apparatus 2A, the information recording apparatus 2A obtains all items of the copy management information 220 stored in the nonvolatile memory 217 in step S310. Then, the information recording apparatus 2A displays, on the screen of an image display device, such as a TV, connected therewith, a list of the obtained items of the copy management information 220 for respective disc IDs 221 in step S320.

FIG. 12 illustrates a screen example d10 of the list of the items of the copy management information 220. In the screen example d10, the content attribute information (the title, the performer information, and the jacket image of a corresponding content), the copy-count information (the total number of copies and the number of copied times), and the limitation information are so correlated with each other as to be displayed as a list.

For example, a content "AAAAA" has already been copied two times in the total number of copies of 4, and a content "BBBBB" has been already copied once in the total number of copies of 2, and the image size of copy destination is limited to be equal to or smaller than the VGA size.

As described above, the information recording apparatus 2A according to this embodiment can display the copy management information 220 including the copy-count information 222 each time a user's display instruction is sent thereto without repeatedly accessing to the server 1.

Next, the first copy-count information update process of the information recording apparatus 2A will be described with reference to FIG. 13.

Even if an optical disc is not inserted into the information recording apparatus 2A, that is, a copy process is not performed, the information recording apparatus 2A accesses, in accordance with access conditions previously established therein, to the server 1 as necessary, that is, regularly or irregularly, to obtain the copy management information 110 (the copy-count information 112). Then, the information recording apparatus 2A updates the copy management information 220 (the copy-count information 222) based on the obtained copy management information 110 (the copy-count information 112), and determines whether to hold, based on the updated copy management information 220, the content data (cached data) stored in the cache of the high-speed storage 201. This considers that an information recording medium whose copy-count information is managed by the information recording apparatus 2A may not be only copied by the information recording apparatus 2A, but copied by another information recording apparatus.

Specifically, if a copy process has been carried out by another information recording apparatus, the copy-count information 112 of the copy management information 110 managed by the server 1 is in disagreement with the copy-count information 222 of the copy management information 220 managed by the information recording apparatus 2A. Thus, the copy-count information 112 managed by the server 1 is reflected on the copy-count information 222 of the information recording apparatus 2A.

If a preset condition for execution of the first copy-count information update process is met, the information recording apparatus 2A prepares disc IDs required to obtain the copy-count information 222 in step S410. The disc IDs required to obtain the copy-count information 222 are all disc IDs 221 that have been managed by the information recording apparatus 2A, that is, all disc IDs 221 stored in the nonvolatile memory 217.

Next, the information recording apparatus 2A selects one of the disc IDs 221 stored in the nonvolatile memory 217 in step S420, and accesses, based on the selected disc ID 221, to the server 1 connected therewith via the communication network 3, thus performing authorization.

The information recording apparatus 2A authorized by the server 1 obtains copy-count information 112 from the server 1 in step S440. Specifically, the information recording apparatus 2A retrieves, based on the selected disc ID 221, copy-count information 112 of a disc ID 111 corresponding to the selected ID 221 from the copy-count management DB 101.

Subsequently, the information recording apparatus 2A reflects the retrieved copy-count information 112 on the copy-count information 222 of the copy management information 220 corresponding to the disc ID 221 in step S450. As a result, the copy-count information 222 of the copy management information 220 corresponding to the selected disc ID 221 is updated to the latest copy-count information, and, as the updated date and time 225, the date and time at which the copy-count information 222 is updated is set to be stored in the nonvolatile memory 217.

Next, the information recording apparatus 2A determines whether to hold the cached data stored in the cache of the high-speed storage 201 in step S210. Specifically, because the copy-count information 222 of the copy management information 220 corresponding to the selected disc ID 221 is updated to the latest copy-count information, the information recording apparatus 2A performs an operation of whether to hold the cached data based on the updated copy-count information 222.

Thereafter, the information recording apparatus 2A determines whether to obtain all items of the copy-count information 222 corresponding to all of the required disc IDs 221 in step S460. When having obtained all items of the copy-count information 222 corresponding to all of the required disc IDs 221, the information recording apparatus 2A terminates the first copy-count information update process (YES in step S460). Otherwise, when having not obtained all items of the copy-count information 222 corresponding to all of the required disc IDs 221, the information recording apparatus 2A returns to step S420.

As described above, the information recording apparatus 2A according to this embodiment is configured to access to the server 1 as necessary to obtain copy-count information of an information recording medium. Thus, even if a copy process of digital contents recorded in the information recording medium has been carried out by another information recording apparatus, it is possible to match the copy-count information stored in the nonvolatile memory 217 with corresponding copy-count information stored in the server 1. In addition, the information recording apparatus 2A deletes, based on the accurate copy-count information, unnecessary content data from content data stored in the cache of the high-speed storage 201 without redundantly increasing it. This efficiently manages the cache.

As described above, the information recording apparatus 2A, which meets the Managed Copy standard, according to this embodiment prevents the capacity of the cache from being increased, thus efficiently managing the cache.

The embodiments of the present invention have been described, but various deformations and/or modifications can be applied to the embodiments of the present invention.

For example, in the copy management system 20 according to the second embodiment, one information recording apparatus 2A is provided in each use's house, but a plurality of information recording apparatuses 2A can be provided such that they communicate with each other via a local area network (LAN). In this modification, the plurality of information recording apparatuses 2A connected with each other via the LAN can transmit and/or receive copy-count information 222 to and/or from each other. In an environment in which copies of digital contents can be carried out within a predetermined range, such as a LAN, even if the information recording apparatuses 2A temporarily cannot communicate with the server 1, the information recording apparatuses 2A can transmit and/or receive copy-count information to and/or from each other. This makes it possible for each of the information recording apparatuses 2A to reflect on its own apparatus the latest copy-count information in the LAN.

Figure 14:
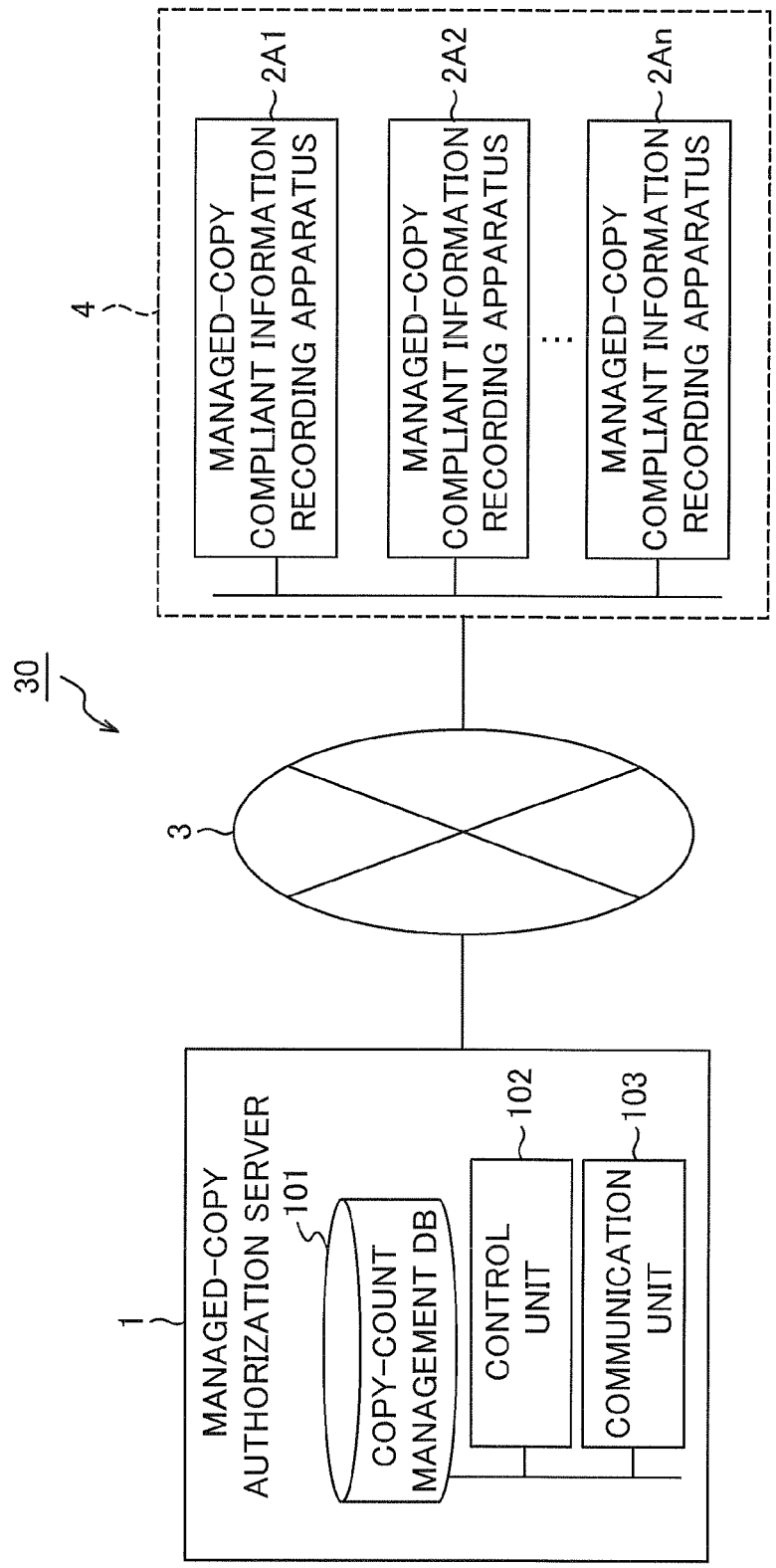
FIG. 14 is a schematic structural view of a copy management system according to a modification of the present invention.

FIG. 14 is a schematic structural view of a copy management system 30 in which a plurality of information recording apparatuses 2A1, 2A2, ..., 2An constitute a LAN 4. Each of the information recording apparatuses 2Ai (i=1, 2, ..., n) of the copy management system 30 performs a second copy-count information update process for communicating copy-count information among the information recording apparatuses 2Ai in addition to the copy process and the first copy-count information update process described in the second embodiment.

Figure 15:
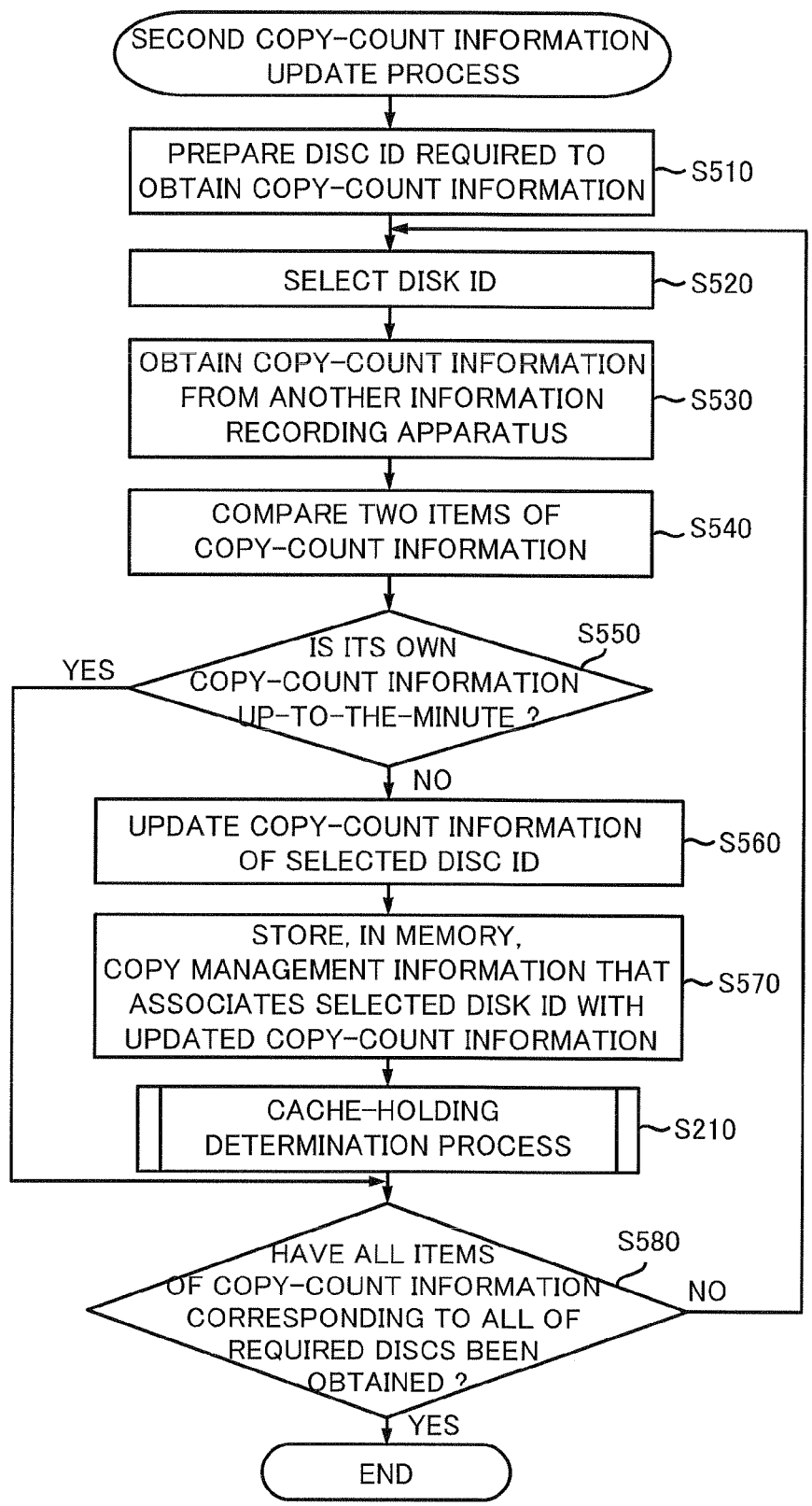
FIG. 15 is a flowchart illustrating a second copy-count information update process of the managed-copy compliant information recording apparatus of the copy management system according to the modification of the present invention.

FIG. 15 is a flowchart illustrating the second copy-count information update process of an information recording apparatus 2Ai assuming that the information recording apparatus 2A1 wants to obtain copy-count information 222 from other information recording apparatuses 2A2, ..., 2An.

When a user instructs execution of the second copy-count information update process, the information recording apparatus 2A1 prepares disc IDs required to obtain the copy-count information 222 in step S510. The disc IDs required to obtain the copy-count information 222 are all disc IDs 221 that have been managed by the information recording apparatus 2A1, that is, all disc IDs 221 stored in the nonvolatile memory 217 of the information recording apparatus 2A1.

Next, the information recording apparatus 2A1 selects one of the disc IDs 221 stored in the nonvolatile memory 217 in step S520.

Thereafter, the information recording apparatus 2A1 accesses to other information recording apparatuses 2A2, ..., 2An, and obtain the copy-count information 222 and the updated date and time 225 corresponding to the selected disc ID 221 from the nonvolatile memories 217 of other information recording apparatuses 2A2, ..., 2An in step S530.

Next, the information recording apparatus 2A1 compares its own copy-count information 222 corresponding to the selected disc ID 221 with the obtained copy-count information 222 in step S540, and determines whether its own copy-count information 222 is up-to-the-minute in step S550. Note that how to compare two items of copy-count information is that, when the number of copied items 222b of one item of copy management information is greater than that of the other item thereof, the one item of copy management information is the latest record, or, when the updated date and time 225 of one item of copy management information is the latest relative to that of the other item thereof, the one item of copy management information is the latest record.

When it is determined that its own copy-count information 222 is not up-to-the-minute (NO in step S550), the information recording apparatus 2A1 updates, based on the obtained latest copy-count information 222, its own copy-count information 222 of the copy management information 220 corresponding to the disc ID in step S560, and stores the updated copy management information 220 in the nonvolatile memory 217 in step S570. Note that the date and time of execution of the updating process is set to the updated date and time 226 of the updated copy management information 220.

Otherwise, when it is determined that its own copy-count information 222 is up-to-the-minute (YES in step S550), the information recording apparatus 2A1 skips the operations in steps S560 and S570 because of no need to update its own copy-count information 222.

Next, the information recording apparatus 2A1 determines whether to hold the cached data stored in the cache of the high-speed storage 201 in step S210. Specifically, because its own copy-count information 222 of the copy management information 220 stored in the nonvolatile memory 217 is updated to the latest copy-count information, the information recording apparatus 2A1 performs an operation of whether to hold the cached data based on the updated copy-count information 222.

Thereafter, the information recording apparatus 2A1 determines whether to obtain all items of the copy-count information 222 corresponding to all of the required disc IDs 221 in step S580. When having obtained all items of the copy-count information 222 corresponding to all of the required disc IDs 221, the information recording apparatus 2A1 terminates the second copy-count information update process (YES in step S580). Otherwise, when having not obtained all items of the copy-count information 222 corresponding to all of the required disc IDs 221, the information recording apparatus 2A1 returns to step S520.

As described above, even if there is a communication failure so that the information recording apparatus 2A1 cannot access to the server 1, the information recording apparatus 2A1 can obtain copy-count information 222 from other information recording apparatuses 2A2, . . . , 2An in the LAN. Thus, assuming that digital contents recorded in an information recording medium are copied in the LAN 4, it is possible to update copy-count information 222 of the information recording apparatus 2A1 to the latest one.

Specifically, in the copy management system 30 according to this modification, because digital contents are copied by the information recording apparatus 2Ai, even under the circumstances in which an information recording apparatus 2Ai cannot access to the server 1, the information recoding apparatus 2Ai can communicate copy-count information 222 to another information recording apparatus 2Ai. Thus, the information recoding apparatus 2Ai obtains the latest copy-count information, and can present it to users. In addition, the information recoding apparatus 2Ai eliminates, based on the latest copy-count information, unnecessary content data from items of content data stored in the cache of the high-speed storage 201. Thus, it is possible to efficiently manage the cache without redundantly increasing it.

DESCRIPTION OF CHARACTERS

1 Managed-copy authorization server
2, 2A Managed-copy compliant information recording apparatus
3 Communication network
4 LAN
10, 20, 30 Copy management system
101 Copy-count management DB
102 Control unit
103 Communication unit
110, 220 Copy management information
111, 221 Disc ID
112, 222 Copy-count information
113, 223 Copy limitation information
224 Content attribute information
225 Updated date and time
201 High-speed storage
202 BD/DVD drive
203 Card I/F
204 Ethernet® I/F
205 USE IF
206 Digital tuner
207 Video ADC
208 Audio ADC
209 HDMI IF
210 Video DAC
211 Audio DAC
212 AV pre/post processor
213 AV encoder
214 AV decoder
215 Stream processor
216 CPU
217 Nonvolatile memory
218 Primary storage memory

The invention claimed is:

1. An information recording apparatus mutually communicable with a copy-count management server that manages medium identifying information for uniquely identifying an information recording medium and information regarding an allowable number of copies of a digital content recorded in the information recording medium to be associated with each other, the information recording apparatus comprising:
a processor; and
a memory serving as a storage medium of the processor,
the processor configured to perform:
an identification information obtaining process that obtains the medium identifying information of an inserted information recording medium;
a first information obtaining process that obtains the information regarding the allowable number of copies from the copy-count management server, the allowable number of copies being associated with the medium identifying information obtained by the identification information obtaining process;
a cached-data registering process that caches content data of the digital content recorded in the inserted information recording medium in a first storage section at preset timing;
a copy determination process that:
when receiving a copy request for the digital content recorded in the inserted information recording medium, determines whether to perform a copy process based on the information regarding the allowable number of copies obtained by the first information obtaining process, and
when determining to perform the copy process, copies the content data cached in the first storage section to an information recording medium as copy destination;
a process-result sending process that sends, to the copy-count management server, a result of the copy process by the copy process process;

a cached-data holding process that holds the content data cached in the first storage section if the information regarding the allowable number of copies, obtained by the first information obtaining process for the digital content recorded in the inserted information recording medium, on which the result of the copy process by the copy process process has been reflected represents that a next copy process is allowed; and a cached-data abandoning process that abandons the content data cached in the first storage section if the information regarding the allowable number of copies, obtained by the first information obtaining process for the digital content recorded in the inserted information recording medium, on which the result of the copy process by the copy process process has been reflected represents that a next copy process is disallowed.

2. The information recording apparatus according to claim 1, wherein the preset timing is to play back or copy the content data with the content data of the digital content recorded in the inserted information recording medium being not present in the first storage section.

3. The information recording apparatus according to claim 1, wherein the processor further is configured to perform:

an information storage process that stores, in a second storage section, copy management information that associates the medium identifying information obtained by the identification information obtaining process with the information regarding the allowable number of copies on which the result of the copy process by the copy process process has been reflected.

4. The information recording apparatus according to claim 3, wherein the processor is further configured to perform:

a second information obtaining process that obtains an item of the information regarding the allowable number of copies from the copy-count management server, the item of the information regarding the allowable number of copies being associated with an item of the medium identifying information in the copy management information stored in the second storage section when a preset condition is met; and a first information updating process that updates, based on the item of the information regarding the allowable number of copies in the copy management information obtained by the second information obtaining process, a corresponding item of the information regarding the allowable number of copies of the copy management information stored in the second storage section, wherein, when the corresponding item of the information regarding the allowable number of copies updated by the first information updating process represents that a next copy process is disallowed, the cached-data abandoning process abandons, from the second storage section, content data associated with the corresponding item of the medium identifying information whose next copy is disallowed.

5. The information recording apparatus according to claim 3, wherein the information recoding apparatus is provided in plurality so that a plurality of information recoding apparatuses are provided, and the plurality of information recording apparatuses are communicable with each other via a local area network, wherein the processor of at least one of the plurality of information recording apparatus is further configured to perform:

a third information obtaining process that obtains an item of the information associated with the allowable number of copies from an alternative one of the plurality of information recoding apparatuses, the item of the information associated with the allowable number of copies corresponding to an item of the medium identifying information; and a second information updating process that:

compares an item of the information associated with the allowable number of copies corresponding to the item of the medium identifying information and obtained by the third information obtaining process with an item of the information associated with the allowable number of copies corresponding to the same item of the medium identifying information and stored in its own second storage section; and when the item of the information associated with the allowable number of copies corresponding to the item of the medium identifying information and obtained from the alternative one of the plurality of information recoding apparatuses is newer than the item of the information associated with the allowable number of copies corresponding to the same item of the medium identifying information and stored in its own second storage section, updates, based on the item of the information associated with the allowable number of copies obtained from the alternative one of the plurality of information recoding apparatuses, the item of the information associated with the allowable number of copies stored in its own second storage section, when the item of the information regarding the allowable number of copies updated by the second information updating process represents that a next copy process is disallowed, the cached-data abandoning process abandons, from the second storage section, content data associated with the same item of the medium identifying information whose next copy is disallowed.

6. The information recording apparatus according to claim 1, wherein the information associated with the allowable number of copies includes a total number of copies predetermined for the information recording medium, and a number of copied times at present.

7. The information recoding apparatus according to claim 1, wherein the copy-count management server is a server compliant with a standard of AACS (Advanced Access Control System) managed copy, and the information recording apparatus is an information recording apparatus compliant with the standard of AACS managed copy.

8. A non-transitory storage medium storing a copy management program readable by a processor of an information recording apparatus mutually communicable with a copy-count management server that manages medium identifying information for uniquely identifying an information recording medium and information regarding an allowable number of copies of a digital content recorded in the information recording medium to be associated with each other, the copy management program instructing the processor to perform:

an identification information obtaining process that obtains the medium identifying information of an inserted information recording medium;

a first information obtaining process that obtains the information regarding the allowable number of copies from the copy-count management server, the allowable number of copies being associated with the medium identifying information obtained by the identification information obtaining process;

a cached-data registering process that caches content data of the digital content recorded in the inserted information recording medium in a first storage section at preset timing;

a copy determination process that:
- when receiving a copy request for the digital content recorded in the inserted information recording medium, determines whether to perform a copy process based on the information regarding the allowable number of copies obtained by the first information obtaining process, and
- when determining to perform the copy process, copies the content data cached in the first storage section to an information recording medium as copy destination;

a process-result sending process that sends, to the copy-count management server, a result of the copy process by the copy process process;

a cached-data holding process that holds the content data cached in the first storage section if the information regarding the allowable number of copies, obtained by the first information obtaining process for the digital content recorded in the inserted information recording medium, on which the result of the copy process by the copy process process has been reflected represents that a next copy process is allowed; and a cached-data abandoning process that abandons the content data cached in the first storage section if the information regarding the allowable number of copies, obtained by the first information obtaining process for the digital content recorded in the inserted information recording medium, on which the result of the copy process by the copy process process has been reflected represents that a next copy process is disallowed.

* * * * *